United States Patent
Wu

(10) Patent No.: US 8,294,698 B2
(45) Date of Patent: Oct. 23, 2012

(54) PROCESSING CIRCUIT AND ELECTRONIC SYSTEM UTILIZING THE SAME

(75) Inventor: I-Lin Wu, Tainan (TW)

(73) Assignee: Chimei Innolux Corporation, Miao-Li County (TW)

( * ) Notice: Subject to any disclaimer, the term of this patent is extended or adjusted under 35 U.S.C. 154(b) by 230 days.

(21) Appl. No.: 12/725,573

(22) Filed: Mar. 17, 2010

(65) Prior Publication Data

US 2011/0018907 A1    Jan. 27, 2011

(30) Foreign Application Priority Data

Apr. 9, 2009  (TW) .............................. 98111797 A

(51) Int. Cl.
*G09G 3/36* (2006.01)
*G09G 5/00* (2006.01)
*G06F 3/038* (2006.01)
*G01J 1/00* (2006.01)
*G01J 1/42* (2006.01)

(52) U.S. Cl. ........ 345/207; 345/102; 345/204; 356/213; 356/218; 356/221

(58) Field of Classification Search ................... 345/102, 345/207; 348/227.1; 250/200, 214 R–214 SW; 73/862.324; 356/213–236
See application file for complete search history.

(56) References Cited

U.S. PATENT DOCUMENTS

| | | | |
|---|---|---|---|
| 7,868,882 B2 * | 1/2011 | Kobashi | 345/207 |
| 2005/0024729 A1 * | 2/2005 | Ockerse et al. | 359/603 |
| 2007/0188441 A1 * | 8/2007 | Tanaka et al. | 345/102 |
| 2009/0066897 A1 * | 3/2009 | Katoh et al. | 349/116 |

* cited by examiner

Primary Examiner — Bipin Shalwala
Assistant Examiner — Ryan A Lubit
(74) Attorney, Agent, or Firm — Thomas|Kayden

(57) ABSTRACT

A processing circuit coupled to a controlling circuit and including a first capacitor module, a second capacitor, a detection module, a first processing module, and a second processing module is disclosed. The first and the second capacitor modules are charged. The detection module generates a detection signal according to intensity of a light to charge the first and the second capacitor modules. The first processing module asserts a first output signal according to the time of charging the first capacitor module. The second processing module asserts a second output signal according to the time of charging the second capacitor module. The controlling circuit controls a backlight according to the asserted output signal.

20 Claims, 4 Drawing Sheets

US 8,294,698 B2

PROCESSING CIRCUIT AND ELECTRONIC SYSTEM UTILIZING THE SAME

CROSS REFERENCE TO RELATED APPLICATIONS

This Application claims priority of Taiwan Patent Application No. 98111797, filed on Apr. 9, 2009, the entirety of which is incorporated by reference herein.

BACKGROUND OF THE INVENTION

1. Field of the Invention

The invention relates to a processing circuit, and more particularly to a processing circuit processing an external light.

2. Description of the Related Art

Liquid crystal displays (LCD) are widely used, as they possess the favorable advantages of thin profile, light weight, and low radiation. LCDs are frequently utilized in portable devices, such as mobile phones and personal digital assistants (PDA). Because LCDs do not emit light, a backlight, preferably capable of providing high, uniform brightness, is utilized to serve as a light source.

Generally, the portable devices comprise a battery to provide power. When LCDs are applied in the portable devices, the backlights will consume a large amount of the battery power. To reduce the power consumption, the conventional method adjusts the intensity of the light emitted from the backlight according to intensity of an external light. The conventional method detects the intensity of the external light and adjusts the intensity of the light emitted from the backlight according to the detection result.

However, the error rate of the detection result is increased when the illumination of the external light is high. FIG. 1 is a schematic diagram of an error rate of a conventional detection result. As shown in FIG. 1, when the illumination of the external light is higher than 800 lux, the error rate of the detection result may be −6% or 8%.

BRIEF SUMMARY OF THE INVENTION

Processing circuits are provided. An exemplary embodiment of a processing circuit is coupled to a controlling circuit and comprises a first capacitor module, a second capacitor, a detection module, a first processing module, and a second processing module. The first capacitor module is charged. The second capacitor module is charged. The detection module generates a detection signal according to intensity of a light for charging the first and the second capacitor modules. The first processing module asserts a first output signal according to the time of charging the first capacitor module. The second processing module asserts a second output signal according to the time of charging the second capacitor module. When the first output signal is asserted, the controlling circuit controls a backlight according to the first output signal for adjusting intensity of a light emitted from the backlight. When the second output signal is asserted, the controlling circuit controls the backlight according to the second output signal for adjusting intensity of the light emitted from the backlight. When the first and the second output signals are asserted, the controlling circuit controls the backlight according to at least one of the first and the second output signals for adjusting intensity of the light emitted from the backlight.

Electronic systems are also provided. An exemplary embodiment of an electronic system comprises a display panel, a backlight, a processing circuit, and a controlling circuit. The display panel displays an image. The backlight emits an appropriate light to serve as a light source for the display panel. The controlling circuit controls the backlight for adjusting the intensity of the light emitted from the backlight. The processing circuit comprises a first capacitor module, a second capacitor, a detection module, a first processing module, and a second processing module. The first capacitor module is charged. The second capacitor module is charged. The detection module generates a detection signal according to intensity of a light for charging the first and the second capacitor modules. The first processing module asserts a first output signal according to the time of charging the first capacitor module. The second processing module asserts a second output signal according to the time of charging the second capacitor module. When the first output signal is asserted, the controlling circuit controls a backlight according to the first output signal. When the second output signal is asserted, the controlling circuit controls the backlight according to the second output signal. When the first and the second output signals are asserted, the controlling circuit controls the backlight according to at least one of the first and the second output signals.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
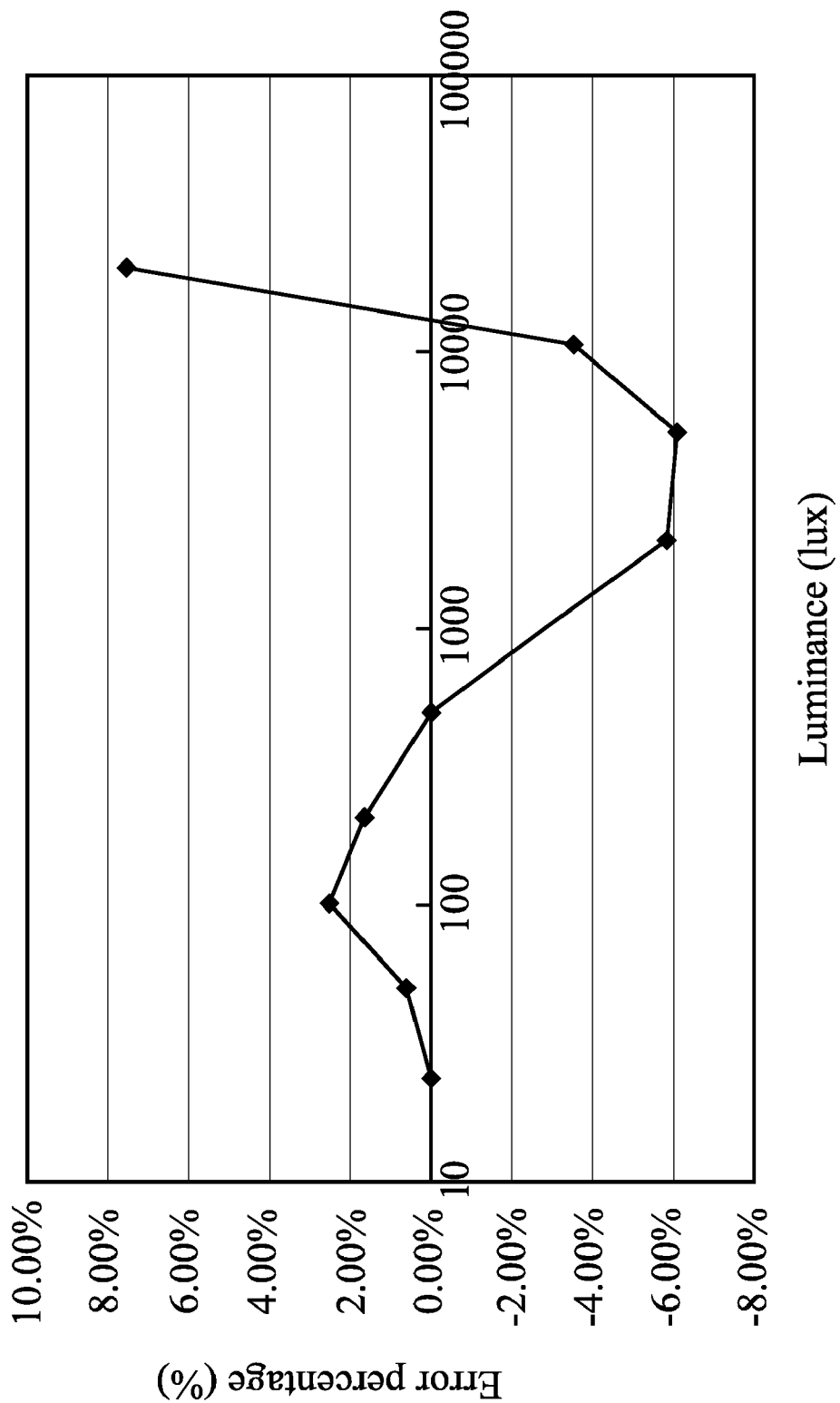
FIG. 1 is a schematic diagram of an error rate of a conventional detection result.
Figure 2:
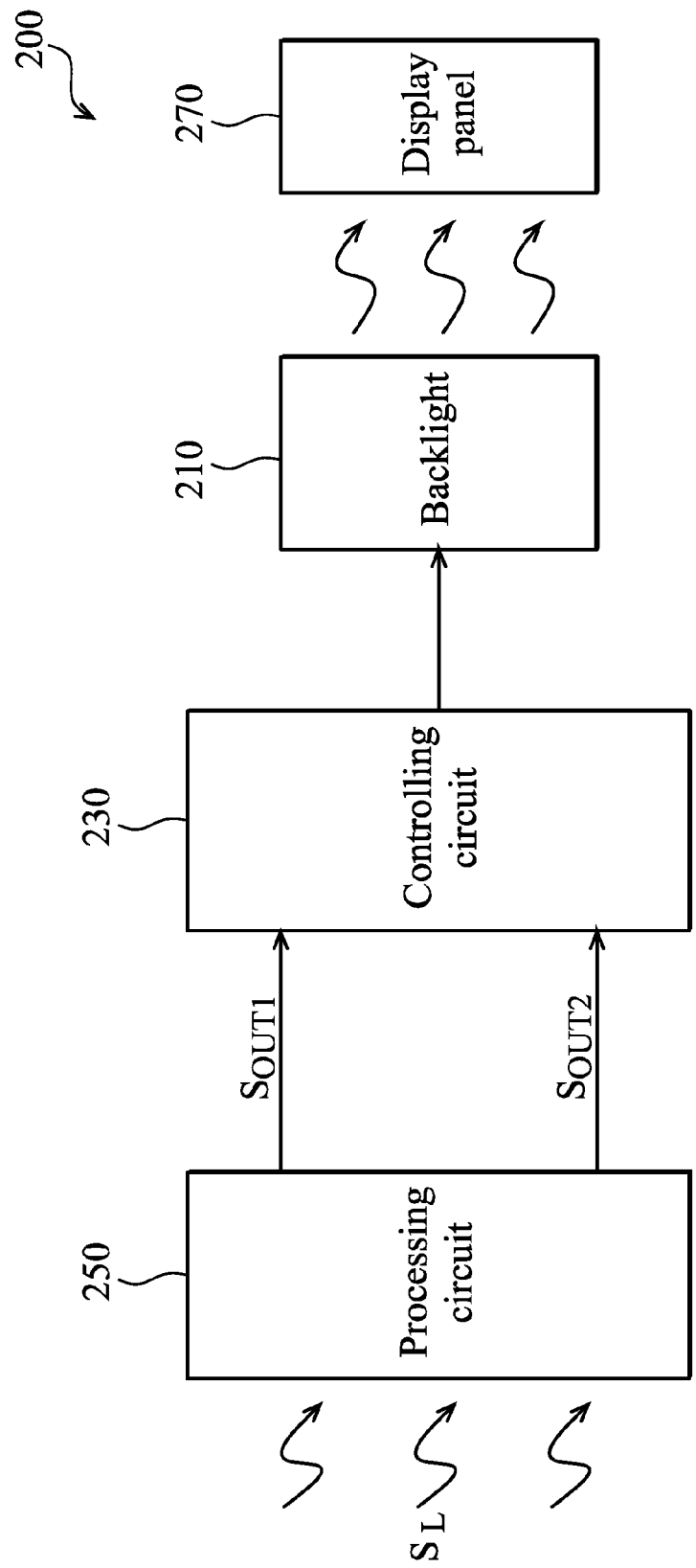
FIG. 2 is a schematic diagram of an exemplary embodiment of an electronic system.

FIG. 2 is a schematic diagram of an exemplary embodiment of an electronic system. In this embodiment, the electronic system 200 may be a personal digital assistant (PDA), a mobile phone, a digital camera, a television, a global positioning system (GPS), a car display, an avionics display, a digital photo frame, a notebook computer (NB), or a personal computer (PC). As shown in FIG. 2, the electronic system 200 comprises a backlight 210, a controlling circuit 230, a processing circuit 250, and a display panel 270. The backlight 210 emits light to serve as a light source for the display panel 270. The processing circuit 250 detects intensity of an external light $S_L$ and generates output signals $S_{OUT1}$ and $S_{OUT2}$ according to the detection result. The controlling circuit 230 controls the backlight 210 according to at least one of the output signals $S_{OUT1}$ and $S_{OUT2}$ for adjusting intensity of the light emitted from the backlight 210.

Figure 3:
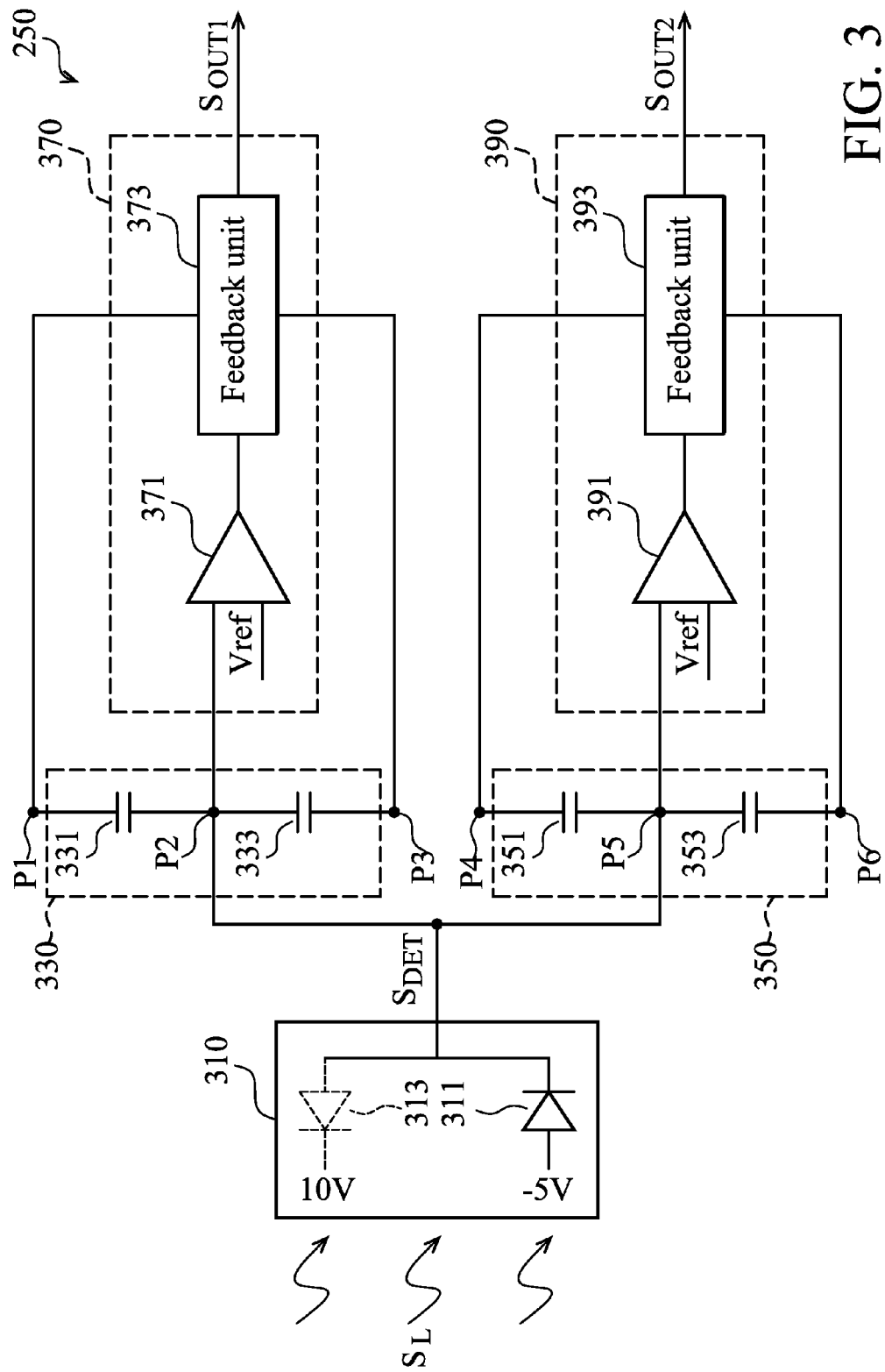
FIG. 3 is a schematic diagram of an exemplary embodiment of a processing circuit.

FIG. 3 is a schematic diagram of an exemplary embodiment of a processing circuit. The processing circuit 250 comprises a detection module 310, capacitor modules 330, 350, and processing modules 370 and 390. The detection module 310 generates the detection signal $S_{DET}$ according to the intensity or the illumination of the external light $S_L$. The capacitor modules 330 and 350 are charged according to the detection signal $S_{DET}$. In one embodiment, the detection signal $S_{DET}$ is a current signal.

The detection module 310 comprises photo sensors 311 and 313. The detection result of the photo sensor 311 may comprise background noise. To eliminate the background noise, the photo sensor 313 is utilized to detect the background noise. In FIG. 3, the background noise can be eliminated. In other embodiments, the photo sensor 313 can be omitted.

In this embodiment, the capacitor module 330 comprises capacitors 331 and 333. The capacitor 331 is coupled between the nodes P1 and P2. The capacitor 333 is coupled between the node P2 and P3. The capacitance of the capacitor 331 equals to the capacitance of the capacitor 333. Further, the capacitor module 350 comprises capacitors 351 and 353. The capacitor 351 is coupled between the nodes P4 and P5. The capacitor 353 is coupled between the nodes P5 and P6. The capacitance of the capacitor 351 equals to the capacitance of the capacitor 353.

The processing module 370 asserts the output signal $S_{OUT1}$ according to the time of charging the capacitor module 330. The processing module 390 asserts the output signal $S_{OUT2}$ according to the time of charging the capacitor module 350. In one embodiment, the processing modules 370 and 390 transform the detection signal $S_{DET}$ from a current type to a square wave type. Accordingly, each of the output signals $S_{OUT1}$ and $S_{OUT2}$ have the square wave type, but the disclosure is not limited thereto. Those skilled in the field can utilize other methods to process the detection signal $S_{DET}$.

In one embodiment, the capacitance of the capacitor module 330 is larger than that of the capacitor module 350. For example, the capacitance of the capacitor module 330 may equal to the equivalent capacitance of the capacitor module 350 multiplied by 10~1000 times. In this embodiment, the capacitance of the capacitor module 330 exceeds the capacitance of the capacitor module 350 by a multiple of 100 times. Since the capacitance of the capacitor module 330 exceeds the capacitance of the capacitor module 350, when the detection signal $S_{DET}$ is less than a preset value (i.e. the intensity of the light $S_L$ is dark), the capacitor module 350 may be fully charged and the capacitor module 330 may not be fully charged. Thus, the processing module 390 asserts the output signal $S_{OUT2}$ and the processing module 370 un-asserts the output signal $S_{OUT1}$. Accordingly, the controlling circuit 230 shown in FIG. 2 controls the backlight 210 according to the asserted output signal (i.e. the output signal $S_{OUT2}$) for adjusting intensity of the light emitted from the backlight 210.

When the detection signal $S_{TET}$ exceeds the preset value (i.e. the intensity of the light $S_L$ is bright), the capacitor modules 330 and 350 are fully charged. In this case, the controlling circuit 230 controls the backlight 210 according to the asserted output signals $S_{OUT1}$ and $S_{OUT2}$ or according to the output signal $S_{OUT1}$ for adjusting the intensity of light emitted from the backlight 210.

In this embodiment, the processing module 370 comprises a comparing unit 371 and a feedback unit 373. The comparing unit 371 is coupled to the node P2 and receives a reference signal Vref. The feedback unit 373 is coupled to the nodes P1 and P3 and asserts the output signals $S_{OUT1}$ according to the output of the comparing unit 371. Similarly, the processing module 390 comprises a comparing unit 391 and a feedback unit 393. The comparing unit 391 is coupled to the node P5 and receives the reference signal Vref. The feedback unit 393 is coupled to the nodes P4 and P6 and asserts the output signals $S_{OUT2}$ according to the output of the comparing unit 391.

Figure 4:
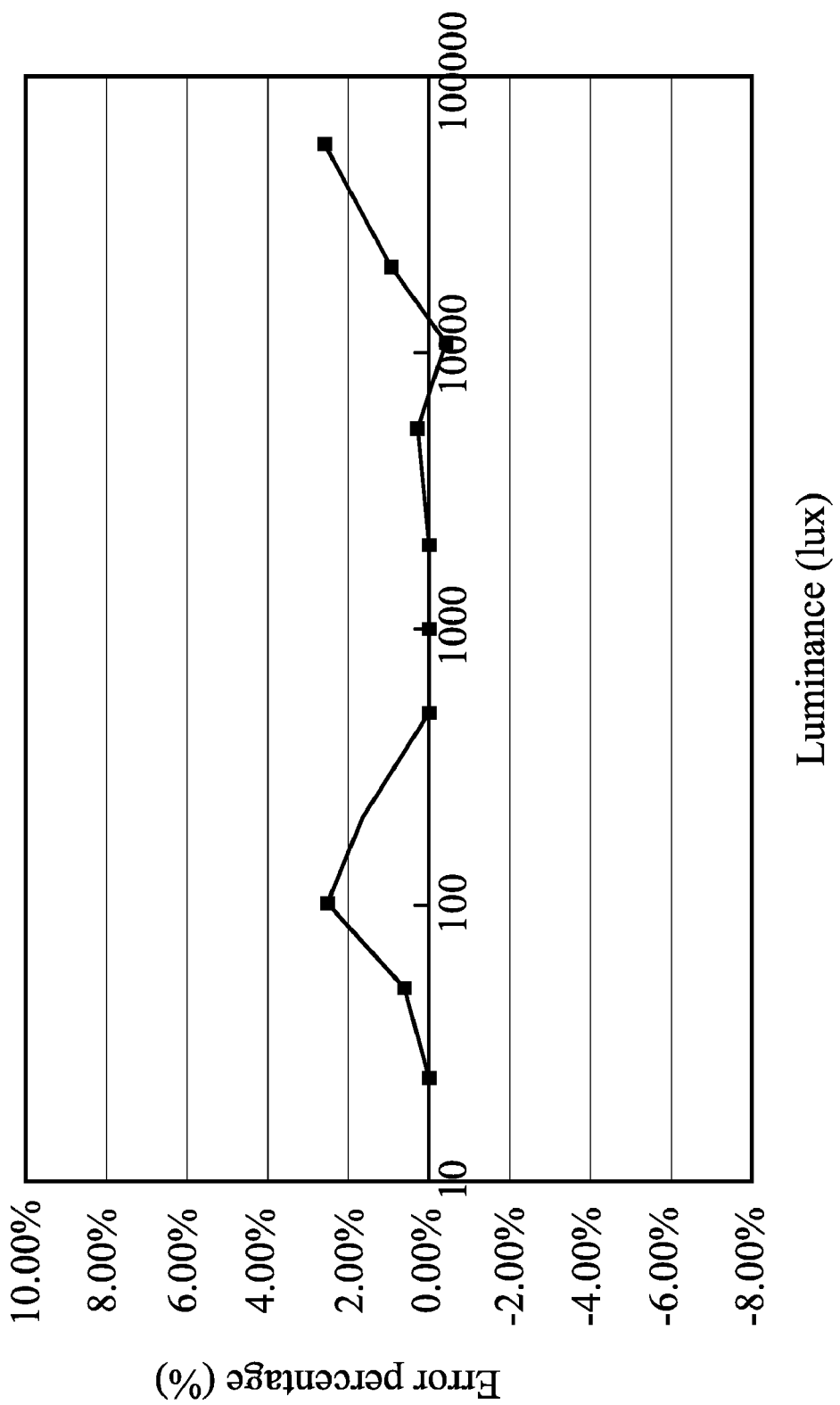
FIG. 4 is a schematic diagram of an error rat of the processing circuit

FIG. 4 is a schematic diagram of an error rate of the processing circuit. The controlling circuit 230 selectively controls the backlight 210 according to at least one of the output signals $S_{OUT1}$ and $S_{OUT2}$. Thus, the error rate of the detection module 310 is maintained between 0~2%.

For example, assume the capacitance of the capacitor module 330 exceeds to the capacitance of the capacitor module 350. If the processing module 370 un-asserts the output signal $S_{OUT1}$ and the processing module 390 asserts the output signal $S_{OUT2}$, it represents that the light $S_L$ is dark. Thus, the controlling circuit 230 controls the backlight 210 according to the asserted output signal $S_{OUT2}$ such that the backlight 210 emits appropriate light. On the other hand, if the processing module 370 asserts the output signal $S_{OUT1}$ and the processing module 390 asserts the output signal $S_{OUT2}$, it represents that the light $S_L$ is brighter. Thus, the controlling circuit 230 controls the backlight 210 according to the asserted output signals $S_{OUT1}$ and $S_{OUT2}$ or according to the asserted output signal $S_{OUT1}$ such that the backlight 210 emits appropriate light.

The controlling circuit 230 controls the backlight 210 selectively according to at least one of the output signals $S_{OUT1}$ and $S_{OUT2}$. Thus, the error rate is maintained between 0~2%.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processing circuit coupled to a controlling circuit, comprising:
    a first capacitor module;
    a second capacitor module;
    a detection module generating a detection signal according to intensity of an external light, wherein the first capacitor module and the second capacitor module are both charged via the detection signal, and wherein the capacity of the first and second capacitor modules are different;
    a first processing module asserting a first output signal according to the time of charging the first capacitor module; and
    a second processing module asserting a second output signal according to the time of charging the second capacitor module, wherein:
    when the first output signal is asserted, the controlling circuit controls a backlight according to the first output signal for adjusting intensity of light emitted from the backlight;
    when the second output signal is asserted, the controlling circuit controls the backlight according to the second output signal for adjusting intensity of the light emitted from the backlight; and
    when the first and the second output signals are asserted, the controlling circuit controls the backlight according to the first and the second output signals or the first output signal for adjusting intensity of the light emitted from the backlight.

2. The processing circuit as claimed in claim 1, wherein the capacity of the first capacitor module is larger than the capacity of the second capacitor module.

3. The processing circuit as claimed in claim 2, wherein the capacity of the first capacitor module is 100~1000 times as larger than the capacity of the second capacitor module.

4. The processing circuit as claimed in claim 1, wherein the first capacitor module comprises:
a first capacitor coupled between a first node and a second node; and
a second capacitor coupled between the second node and a third node.

5. The processing circuit as claimed in claim 4, wherein the capacity of the first capacitor equals the capacity of the second capacitor.

6. The processing circuit as claimed in claim 4, wherein the first processing module comprises:
a first comparing unit coupled to the second node and receiving a reference signal; and
a first feedback unit coupled to the first and the third nodes and asserting the first output signal according to the output of the first comparing unit.

7. The processing circuit as claimed in claim 6, wherein the second capacitor module comprises:
a third capacitor coupled between a fourth node and a fifth node; and
a fourth capacitor coupled between the fifth node and a sixth node.

8. The processing circuit as claimed in claim 7, wherein the capacity of the third capacitor equals the capacity of the fourth capacitor and the capacity of the fourth capacitor is less than the capacity of the first capacitor.

9. The processing circuit as claimed in claim 7, wherein the second processing module comprises:
a second comparing unit coupled to the fifth node and receiving the reference signal; and
a second feedback unit coupled to the fourth and the sixth nodes and asserting the second output signal according to the output of the second comparing unit.

10. An electronic system, comprising:
a display panel displaying an image;
a backlight emitting a light to serve as a light source for the display panel;
a controlling circuit controlling the backlight for adjusting the intensity of the light emitted from the backlight; and
a processing circuit comprising:
a first capacitor module;
a second capacitor module;
a detection module generating a detection signal according to intensity of an external light, wherein the first capacitor module and the second capacitor module are both charged via the detection signal, and wherein the capacity of the first and second capacitor modules are different;
a first processing module asserting a first output signal according to the time of charging the first capacitor module; and
a second processing module asserting a second output signal according to the time of charging the second capacitor module, wherein:
when the first output signal is asserted, the controlling circuit controls the backlight according to the first output signal,
when the second output signal is asserted, the controlling circuit controls the backlight according to the second output signal; and
when the first and the second output signals are asserted, the controlling circuit controls the backlight according to the first and the second output signals or the first output signal.

11. The processing circuit as claimed in claim 10, wherein the capacity of the first capacitor module is larger than the capacity of the second capacitor module.

12. The processing circuit as claimed in claim 11, wherein the capacity of the first capacitor module is 100~1000 times larger than the capacity of the second capacitor module.

13. The electronic system as claimed in claim 10, wherein the first capacitor module comprises:
a first capacitor coupled between a first node and a second node; and
a second capacitor coupled between the second node and a third node.

14. The processing circuit as claimed in claim 13, wherein the capacity of the first capacitor equals the capacity of the second capacitor.

15. The electronic system as claimed in claim 13, wherein the first processing module comprises:
a first comparing unit coupled to the second node and receiving a reference signal; and
a first feedback unit coupled to the first and the third nodes and asserting the first output signal according to the output of the first comparing unit.

16. The electronic system as claimed in claim 15, wherein the second capacitor module comprises:
a third capacitor coupled between a fourth node and a fifth node; and
a fourth capacitor coupled between the fifth node and a sixth node.

17. The processing circuit as claimed in claim 16, wherein the capacity of the third capacitor equals the capacity of the fourth capacitor and the capacity of the fourth capacitor is less than the capacity of the first capacitor.

18. The electronic system as claimed in claim 16, wherein the second processing module comprises:
a second comparing unit coupled to the fifth node and receiving the reference signal; and
a second feedback unit coupled to the fourth and the sixth nodes and asserting the second output signal according to the output of the second comparing unit.

19. The electronic system as claimed in claim 10, wherein the electronic system is a personal digital assistant (PDA), a mobile phone, a digital camera, a television, a global positioning system (GPS), a car display, an avionics display, a digital photo frame, a notebook computer (NB), or a personal computer (PC).

20. The electronic system as claimed in claim 10, wherein the detection module comprises a photo sensor comprising a cathode coupled to the first and the second capacitor modules.

* * * * *